May 6, 1958  E. J. MARTIN ET AL  2,833,985

PERMEAMETER

Filed Sept. 11, 1953

INVENTORS
Edward J. Martin &
BY Walter E. Sargeant

L. D. Burch
ATTORNEY

United States Patent Office 2,833,985
Patented May 6, 1958

2,833,985

PERMEAMETER

Edward J. Martin, Pleasant Ridge, and Walter E. Sargeant, Huntington Woods, Mich., assignors to General Motors Corporation, Detroit, Mich., a corporation of Delaware Application September 11, 1953, Serial No. 379,628

5 Claims. (Cl. 324—34)

This invention relates to permeameters in general and in particular to a device for determining the unknown magnetic permeability of a material by comparison with an element of known permeability.

The presence of stray magnetic influences near certain devices such as compasses, precision electrical instruments and other apparatus is known to distort the existing magnetic field of the earth or those fields purposely introduced within such devices and to have an adverse effect upon the proper operation of such equipment. Association with such disturbances is of no consequence unless the materials of which the device is made are conductive of magnetic flux and have a degree of magnetic retentivity, in which event those materials become permanently magnetized and the accuracy of the instrument is impaired until the device is demagnetized. It is therefore important that materials used in making such equipment are not conductive of magnetic flux or at least have very low magnetic permeability.

Another illustrative reason for desiring to know the magnetic permeability of materials of construction is in the ship building industry. During time of war sea going vessels are subject to the dangers of enemy mines planted within harbors and sea lanes. Certain of these mines are set to the earth's magnetic field and are adapted to explode when the earth's field within their vicinity is disturbed. Large vessels passing over the mine field, being made of ferrous materials, distort the earth's magnetic fields and explode the mines. It is therefore precautionary to test all materials used in building a ship to enable the selection of those materials having the lowest magnetic signal or permeability. Where a vessel is to be constructed whose sole function is to clear mine infested waters every possible precaution to reduce the magnetic signal of the vessel is exercised. Every plate welded to the hull, every piece of machinery, every rivet, screw and weld is tested for magnetic permeability.

Permeameters which have been employed in the past for determining the permeability of materials have not been completely satisfactory. Most of these devices are very delicate and require careful handling and protection from adverse magnetic influences. Where a permanent magnet is used rough treatment or association with other ferromagnetic materials alters the pole configuration of the magnet and consequently the accuracy of the device. Heretofore the comparison method of determining permeability has generally involved the use of individual known standards of different permeability which are separately compared with the unknown specimen. Such a method is slow and at best gives only an approximation of permeability rather than an exact determination. The necessity of changing the known permeability standards further increases the likelihood of mishandling and damaging the device.

It is an object of this invention to provide a magnetic field in which a member of soft iron, nickel or some suitable alloy, having low hysteresis and a permeability differing from the surrounding media, is adapted to be suspended and to assume a position of balance therein. The introduction of a permeable element within the balanced field is adapted to alter the field and move the core to a new position of balance. By regulation of an adjustable standard of permeability to correspond to the permeability of the unknown specimen the magnetic field is rearranged and the core returned to its original balance location.

It is also an object of this invention to provide a permeameter which is not permanently affected by stray magnetic influences and which is not adversely affected by rough use. It is another object of this invention to provide a durable and compact device for comparing permeability which has all elements permanently associated therewith and involves no interchanging of parts for reasons other than repair or inspection. It is a further object of this invention to provide a standard of permeability which can be varied electrically while in place, and which is capable of simulating a highly permeable element. It is a still further object of this invention to provide a means of obtaining an accurate numerical indication of permeability by use of a calibrated meter connected in the circuit of the adjustable permeability standard.

Figure 1:
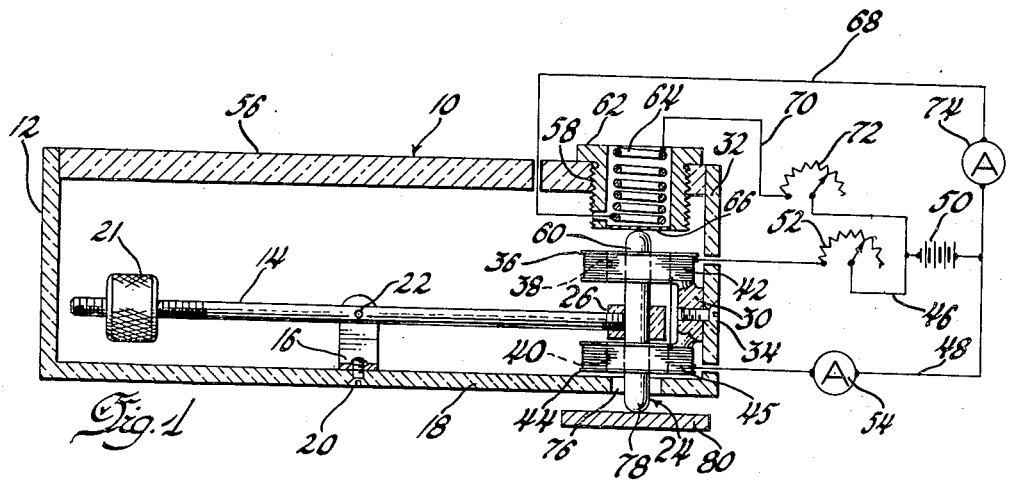
Figure 1 is a top elevational view of a device embodying the principles of this invention and having diagrammatically illustrated thereon the electrical circuits incident to the device.
Figure 2:
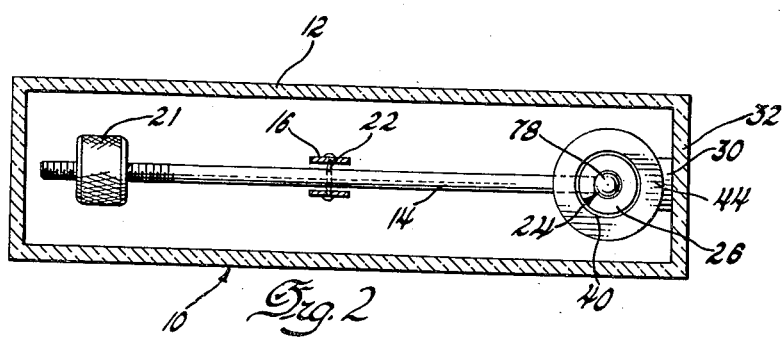
Figure 2 is a side elevational view of the permeameter with parts broken away and in section.

The permeameter 10 comprises a rectangular box or housing 12, having one side open to provide access thereto. An arm or lever 14 is pivotally mounted within the housing 12 upon a support 16. The support 16 is secured to the side 18 of the housing by a screw 20 and includes a pivot pin 22 extending through the arm 14 intermediate its ends. A soft iron bar 24 having a collar 26 secured around its mid-section is secured transversely across one end of the arm 14 by threaded engagement of the collar with the end of the arm. The other end of the arm 14 is threaded to receive an axially movable counterweight 21 adapted to balance the arm upon the pivot pin 22.

A bracket 30 is secured to the end 32 of the housing and adjacent the iron bar 24 by a screw 34. The bracket 30 includes two spools 36 and 44 disposed in spaced relation to each other and having axially aligned openings 38 and 40 formed therethrough. The iron bar 24 is axially positioned within the openings 38 and 40 with the collar 26 disposed between the spools 36 and 44. Electrical windings 42 and 45 are secured around the spools 36 and 44 respectively and are connected in series by leads 46 and 48 to a power supply source 50. A potentiometer 52 is secured within the lead 46 and an ammeter 54 within the lead 48 to provide for regulation of the current supplied to the two windings.

A cover plate 56 is adapted to be removably secured to the open side of the housing 12 in any convenient manner and has a threaded opening 58 formed through one end thereof adjacent the end 60 of the bar 24. An insert plug 62 is removably threaded within the opening 58 and includes an electrical coil 64 and a diaphragm 66. The diaphragm 66 is disposed across the innermost end of the insert plug and separates the coil 64 from the bar 24. The coil 64 is connected by leads 68 and 70 to the power supply source 50 and has a potentiometer 72 and an ammeter 74 secured within the leads to provide for the regulation of current thereto.

An opening 76 is formed through the side 18 of the housing 12 and is adapted to receive the other end 78 and the bar 24 therethrough.

When the permeameter 10 is first assembled the arm 14 is balanced upon the support 16 with the iron bar 24 axially positioned within the windings 42 and 44 and in spaced relation thereto for freedom of axial movement. The end 78 of the bar 24 extends through the opening 76. The cover plate 56 is placed on the housing 10 and the insert plug 62 is screwed into the opening 58 with the diaphragm 66 thereof brought into light engagement with the end 60 of the bar 24. A member 80 of unknown permeability which is to be tested is then positioned in close proximity to the end 78 of the bar 24 protruding through the opening 76.

When an electrical current is applied to the windings 42 and 45 from the power source 50 a magnetic field is produced. The iron bar 24 immediately assumes a position of balance within the magnetic field. The bar will remain immovably within the magnetic field so long as the field is not disturbed. If the member 80 to be tested has no permeability the magnetic field is not disturbed and the iron bar is not moved. If the member 80 has a permeability greater than that of air, which is the normal media of the magnetic lines of flux, the magnetic field will be altered and the core will shift to a new balance location. The coil 64 is then energized by regulation of the potentiometer 72 to the extent necessary to counterbalance the field disturbance caused by the permeable member 80 and to rearrange the magnetic field to that existing before the member 80 was introduced. When such a condition prevails the core returns to its original balance position. The effect of the field of the coil 64 in disturbing the position of balance is equal and opposite to the disturbance created by the unknown member 80 and the permeability of such member is therefore readable on the calibrated ammeter 74.

In the present embodiment of this invention it is preferred that the known and unknown permeable members are spaced equidistantly from the normal magnetic field center, are diametrically opposed, and have the same surface areas. If these conditions do not prevail the same number of flux lines will not be cut by both members. Although the adjustable member may be regulated to return the field center to its original position it is required to be more permeable than the unknown member and the reading will not be a true indication of the permeability of the unknown member. These factors must therefore be given consideration in the use of the proposed device and where such conditions cannot be set up further calculation is required to determine the resultant effects and arrive at a true indication of permeability.

We claim:

1. A permeameter comprising a housing having a balanced support arm mounted therein, a ferromagnetic bar secured to one end of said arm, means within said housing for producing a magnetic field about said bar, said bar being adapted to assume a position of magnetic balance centrally within said field, an electrical coil secured to said housing, one end of said bar being disposed adjacent said coil and the other end thereof being adapted to be disposed adjacent a member of unknown permeability, said member altering the configuration of said magnetic field and thereby repositioning said bar, and calibrated means connected to said coil for adjusting the magnetic conductivity thereof to rearrange said field and return said bar to its original balance position.

2. A permeameter comprising a housing having a balanced support arm pivotally mounted therein, a ferromagnetic bar secured transversely across one end of said arm, means for producing a magnetic field about said bar, said bar being adapted to assume a position of magnetic balance centrally within said field, aligned openings formed through opposite sides of said housing and adjacent the ends of said bar, an electrical coil secured within one of said openings, the other of said openings being disposed adjacent a member of unknown permeability, said member being adapted to alter the configuration of said magnetic field and move said bar to a new balance center, said coil having calibrated means for varying the conductivity of said coil to further alter said field and return said bar to its original balance position.

3. A permeameter comprising a housing having a support arm pivotally mounted therein, a bar secured transversely across one end of said arm, electrical windings secured to one end of said housing and disposed in spaced relation about the ends of said bar, openings formed through opposite sides of said housing and axially aligned with said bar, an electrical coil removably secured within one of said openings, the other of said openings being adapted to be placed in close proximity to a member of unknown permeability, a source of electrical power connected to said windings for producing a magnetic field about said bar, said bar assuming a position of magnetic balance centrally within said field, and means for adjusting the magnetic conductivity of said coil for varying the configuration of said magnetic field to correspond to the effect of said permeable member thereon and to enable said bar to maintain its original balance position.

4. A permeameter comprising a housing having a support arm pivotally mounted therein, a bar secured transversely across one end of said arm, counterbalancing means associated with the other end of said arm, electrical windings secured to one end of said housing and disposed in spaced relation about the ends of said bar, openings formed through opposite sides of said housing and axially aligned with said bar, an electrical coil removably secured within one of said openings, a diaphragm disposed across the innermost end of said coil and adjacent one end of said bar, the other end of said bar projecting through the other of said openings and being adapted to be placed in close proximity to a member of unknown permeability, a source of electrical power connected to said windings for producing a magnetic field about said bar, said bar being adapted to assume a position of magnetic balance centrally within said field, said permeable member distorting said field and moving said bar, and means for varying the magnetic conductivity of said coil to rearrange said field and return said bar to its original balance position, said means being calibrated to indicate permeability.

5. A permeameter comprising a housing having a balanced arm pivotally mounted upon a support secured therein, a soft iron bar transversely secured intermediate its extremities across one end of said arm, counterbalancing means associated with the other end of said arm, a bracket secured to the end of said housing adjacent said bar and having electrical windings secured thereto and disposed in spaced relation about opposite ends of said bar, openings formed through opposite sides of said housing and axially aligned with said bar, one of said openings being adapted to receive one end of said bar therethrough, the other of said openings having an electrical coil removably secured therein, a variable source of electrical power connected to said windings and to said coil, said one end of said bar being adapted to be positioned in close proximity to a permeable member, and means for controlling the electrical current applied to said coil to vary the magnetic conductivity of said coil to correspond to the magnetic permeability of said permeable member.

(References on following page)

References Cited in the file of this patent

UNITED STATES PATENTS

| | | |
|---|---|---|
| 777,750 | Sargent | Dec. 20, 1904 |
| 1,746,627 | Babbitt | Feb. 11, 1930 |
| 2,151,627 | Vacquier | Mar. 21, 1939 |
| 2,384,529 | Breitenstein | Sept. 11, 1945 |
| 2,600,857 | De La Mater | June 17, 1952 |
| 2,738,460 | Gross | Mar. 13, 1956 |
| 2,750,561 | Gross | June 12, 1956 |

FOREIGN PATENTS

| | | |
|---|---|---|
| 757,150 | Great Britain | Feb. 5, 1946 |